Patented Apr. 11, 1939

2,153,962

UNITED STATES PATENT OFFICE 2,153,962

RUBBER COMPOSITION AND METHOD OF PRESERVING RUBBER

Werner M. Lauter, Cuyahoga Falls, Ohio, assignor to Wingfoot Corporation, Akron, Ohio, a corporation of Delaware No Drawing. Application July 13, 1933,
Serial No. 680,258

13 Claims. (Cl. 18—50)

This invention relates to a new class of age resisting materials suitable for incorporation as antioxidants in rubber and other deteriorable compositions. The substances comprising the class in question have been found by numerous tests to protect rubber against deterioration from such influences as heat, light and oxygen. They have also been found to materially enhance the resistance of rubber to deterioration by flexing. In addition they impart other desirable properties such as improved tensile strength of the vulcanized product.

Substances which may be employed as antioxidants in accordance with the teachings of the invention are reaction products formed by reacting under pressure an aromatic or hydro-aromatic primary or secondary amine with a hydrocarbon carbonyl compound in the presence of formic acid at such a temperature that the formic acid acts simultaneously both as a condensation and a reduction agent. This reaction is commonly referred to as the "Leuckert-Wallach" reaction and is described in the literature as applied to alkyl amines by O. Wallach in Annalen 343, pages 54 to 74. When employing starting materials in the lower molecular weight range, the products obtained are generally definite compounds while in the case of the more complex carbonyls and amines, reaction products of unknown constitution are formed. In either case the products are excellent antioxidants for rubber.

Particularly illustrative of the invention are the reaction product of diphenyl amine, diacetone alcohol and formic acid; the reaction product of p p' diamino diphenyl methane, acetone and formic acid; the reaction product of phenyl beta naphthylamine, ethyl aceto acetate and formic acid; the reaction product of phenyl beta naphthylamine, diacetone alcohol and formic acid; the reaction product of para phenylene diamine, acetone and formic acid; N-isopropyl diphenyl amine prepared from diphenyl amine, acetone and formic acid; the reaction product of beta naphthylamine, acetone and formic acid; N-isopropyl phenyl beta naphthylamine prepared from phenyl beta naphthylamine, acetone and formic acid; and N-isopropyl o-amino-m-cresol prepared from o-amino-m-cresol, acetone and formic acid.

The amines capable of being employed in this invention are primary or secondary aromatic amines and may be represented by the formula

wherein at least one of the R groups is an aromatic radical. Illustrative of other aromatic amines which may be employed in the practice of the invention are aniline, ortho, meta or para toluidine, the xylidines, amino biphenyl, alpha naphthylamine, meta cumidine, meta phenylene diamine; the amino phenols such as ortho and para amino phenol, the amino naphthols such as alpha amino beta naphthol, meta toluylene diamine, diamino phenyl naphthyl ether, amino acetanilide, 1-8-naphthylene diamine, phenyl alpha naphthylamine, the dinaphthyl amines, the ditolyl amines, phenyl tolyl amine, N-iso-propyl cumidine, N-butyl phenyl amine, phenyl xylyl amine, xylyl naphthylamine, tolyl xylyl amine, xylyl benzidine, naphthyl benzidines and amino cresols.

By the term "hydrocarbon carbonyl compound" is intended to include any compound of the type

wherein at least one of the R groups is a hydrocarbon radical. Further illustrative of such compounds are methyl ethyl ketone, diethyl ketone, methyl isobutyl ketone, benzoquinone, acetophenone, dinaphthyl ketones, ketone sugars, pyruvic acid, pyruvic acid esters, dipropyl ketone, acetaldehyde, butyric aldehyde, crotonic aldehyde, heptaldehyde, benzaldehyde, furfuraldehyde, salicylic aldehyde and hydroxy naphthaldehyde.

Exemplary of the products which may be produced by employing the reaction of this invention is the product obtained by reacting para phenylene diamine with acetone and formic acid. In its preparation 162 grams of para phenylene diamine, 192 grams of acetone and 138.5 grams of formic acid are reacted in an autoclave for a period of approximately two hours at a temperature of approximately 200° C. The product, after being washed with sodium carbonate solution, dried and distilled in vacuo, is obtained in the form of an oily material having a boiling range of from 150 to 250° C. at 14 mm. pressure.

In other example 254 grams of diphenyl amine, 183 grams of diacetone alcohol and 80 grams of formic acid are heated in an autoclave for two hours at 210° C. The product, isolated by washing with sodium carbonate solution, drying and distilling in vacuo, has a boiling point of from 150–160° C. at 9 mm. pressure.

Similarly, the reaction product of phenyl beta naphthylamine, ethyl aceto acetate and formic acid is obtained by reacting in an autoclave 242 grams of phenyl beta naphthylamine, 160 grams of ethyl acetoacetate and 60 grams of formic acid for two hours at 200° C. The crude product is then separated from phenyl beta naphthylamine by petroleum ether which dissolves the reaction product. After evaporation of the solvent and distillation in vacuo, an oil boiling from 229–235° C. at 9 mm. pressure is obtained.

In still another example 171 grams of beta naphthylamine, 160 grams of acetone and 150 grams of formic acid are heated in an autoclave for two hours at 195–200° C. The reaction product, after being washed with sodium carbonate solution, dried and distilled in vacuo, is obtained in a yield of approximately 185 grams boiling between 160 and 205° C. at 9 mm. pressure. Other reaction products of this invention are obtained merely by employing the desired amine and hydrocarbon carbonyl compounds and then reacting them with formic acid as disclosed in the above examples.

Conveniently these materials may be compounded in a rubber stock having the following formula

| | Parts by weight |
|---|---|
| Extracted pale crepe rubber | 100 |
| Zinc oxide | 5 |
| Sulfur | 3 |
| Hexamethylene tetramine | 1 |
| Stearic acid | 1.5 |
| Antioxidant | 1 |

Samples prepared in accordance with the foregoing formula, different antioxidants being employed, were subjected to vulcanization for varying periods of time and then tested to ascertain their physical characteristics. One set from each type of stock was tested immediately for tensile strength and elasticity, while a second set was subjected to ageing in a Bierer-Davis bomb for 6 days in oxygen at 50° C. and 150 pounds per square inch pressure. At the conclusion of the 6-day period the samples were removed from the bomb and subjected to physical tests corresponding to those conducted upon the unaged samples. It is evident from the following tables that rubber compositions containing even small proportions of the antioxidants of this invention resist deterioration remarkably well. Similar compositions not containing the antioxidants, on being subjected to corresponding tests increase in weight in the neighborhood of ten per cent and lose almost all their tensile and elongation properties.

| Cure in mins. at °F. | Ultimate tens. | Maximum elong. | Modulus at— | | Percent weight increase |
|---|---|---|---|---|---|
| | | | 500% | 700% | |

REACTION PRODUCT OF P-PHENYLENE DIAMINE AND ACETONE AND FORMIC ACID

*Original*

| 35/285 | 159 | 750 | 78 | 115 | |
| 50/285 | 194 | 750 | 33 | 138 | |
| 70/285 | 190 | 685 | 50 | | |

*Aged*

| 35/285 | 101 | 710 | 37 | 154 | 0.02 |
| 50/285 | 180 | 685 | 47 | ------ | .03 |
| 70/285 | 189 | 650 | 68 | ------ | .08 |

N-ISOPROPYL-O-AMINO-M-CRESOL

*Original*

| 35/285 | 115 | 850 | 14 | 47 | |
| 50/285 | 140 | 780 | 23 | 85 | |
| 70/285 | 161 | 755 | 28 | 112 | |

*Aged*

| 35/285 | 126 | 745 | 26 | 96 | 0.71 |
| 50/285 | 143 | 680 | 40 | 55 | .19 |
| 70/285 | 152 | 645 | 55 | | .28 |

REACTION PRODUCT OF DIPHENYLAMINE, DIACETONE-ALCOHOL AND FORMIC ACID

*Original*

| 35/285 | 111 | 875 | 13 | 40 | |
| 50/285 | 124 | 825 | 18 | 58 | |
| 70/285 | 150 | 805 | 21 | 77 | |

*Aged*

| 35/285 | 78 | 825 | 14 | 39 | 0.43 |
| 50/285 | 96 | 785 | 18 | 57 | .42 |
| 70/285 | 102 | 735 | 23 | 61 | .36 |

REACTION PRODUCT OF P-P'-DIAMINO-DIPHENYL METHANE, ACETONE AND FORMIC ACID

*Original*

| 35/285 | 100 | 825 | 26 | 47 | |
| 50/285 | 129 | 805 | 30 | 69 | |
| 70/285 | 146 | 760 | 36 | 100 | |

*Aged*

| 35/285 | 118 | 815 | 18 | 10 | 0.15 |
| 50/285 | 132 | 790 | 20 | 78 | .03 |
| 70/285 | 136 | 725 | 29 | 117 | .10 |

REACTION PRODUCT OF PHENYL-BETA-NAPHTHYLAMINE, DIACETONE-ALCOHOL AND FORMIC ACID

| 35/285 | 103 | 870 | 14 | 39 | |
| 50/285 | 130 | 835 | 18 | 58 | |
| 70/285 | 152 | 805 | 22 | 79 | |

*Aged*

| 35/285 | 102 | 840 | 14 | 44 | 0.11 |
| 50/285 | 114 | 800 | 18 | 65 | .14 |
| 70/285 | 135 | 771 | 24 | 89 | .17 |

REACTION PRODUCT OF PHENYL-BETA-NAPHTHYLAMINE, ETHYL ACETO ACETATE AND FORMIC ACID

*Original*

| 35/285 | 111 | 890 | 13 | 38 | |
| 50/285 | 125 | 825 | 17 | 60 | |
| 70/285 | 137 | 780 | 23 | 82 | |

*Aged*

| 35/285 | 104 | 825 | 16 | 50 | 0.07 |
| 50/285 | 110 | 775 | 18 | 68 | .15 |
| 70/285 | 128 | 740 | 25 | 97 | .09 |

REACTION PRODUCT OF BETA NAPHTHYLAMINE, ACETONE AND FORMIC ACID

*Original*

| 35/285 | 101 | 840 | 13 | 44 | |
| 50/285 | 130 | 825 | 18 | 62 | |
| 70/285 | 158 | 805 | 22 | 84 | |

*Aged*

| 35/285 | 74 | 760 | 14 | 50 | 0.09 |
| 50/285 | 107 | 785 | 15 | 62 | .26 |
| 70/285 | 104 | 725 | 22 | 90 | .23 |

From the foregoing it is apparent that the compounds herein disclosed are highly suitable for antioxidants in rubber and other products which deteriorate under the influence of heat, light and oxygen. Not only do these compounds counteract the effect of such influences, but they tend to impart other highly desirable qualities such, for example, as increased resistance to deterioration by flexing. It will be apparent that numerous changes may be made in the procedure to be followed and the chemicals employed without departing from the inventive concept. It is intended that the patent shall cover by suitable expression in the appended claims, whatever features of patentable novelty reside in the invention.

What I claim is:

1. A method of preserving rubber which comprises treating the same with the composite product resulting from the simultaneous interaction of an aromatic amine containing not less than one and not more than two amino hydrogen atoms, a hydrocarbon carbonyl compound in which one substituent of the carbonyl group contains a hydrocarbon structure and the other substituent is hydrogen or contains a hydrocarbon structure, and formic acid, the formic acid being present in an amount equal to approximately one mol of the acid to each unsubstituted hydrogen atom in the amino group, said composite reaction product having antioxidant properties.

2. A method of preserving rubber which comprises subjecting it to vulcanization in the presence of the composite product resulting from the simultaneous interaction of a secondary aromatic amine, a ketone and formic acid, the formic acid being present in an amount equal to approximately one mol of the acid to one mol of the amine, said composite product having antioxidant properties.

3. A method of preserving rubber which comprises subjecting it to vulcanization in the presence of the composite product resulting from the simultaneous interaction of a primary aromatic amine, a ketone and formic acid, the formic acid being present in an amount equal to approximately two mols of the acid to each mol of the amine, said composite product having antioxidant properties.

4. A method of preserving rubber which comprises subjecting it to vulcanization in the presence of the composite product resulting from the simultaneous interaction, at a temperature in the neighborhood of 200° C., of a secondary aromatic amine, diacetone alcohol and formic acid, the formic acid being present in an amount equal to approximately one mol of the acid to one mol of the amine, said composite product having antioxidant properties.

5. A method of preserving rubber which comprises treating the same with the composite product resulting from the simultaneous interaction of an amine having the formula R—NH—R₁, wherein R is an aryl group and R₁ is aryl, alkyl or hydrogen, a hydrocarbon carbonyl compound in which one substituent of the carbonyl group contains a hydrocarbon structure and the other substituent is hydrogen or contains a hydrocarbon structure, and formic acid, the formic acid being present in an amount equal to approximately one mol of the acid to each unsubstituted hydrogen atom in the amino group, said composite product having antioxidant properties.

6. A method of preserving rubber which comprises vulcanizing the same in the presence of the composite reaction product resulting from the simultaneous interaction, at a temperature in the neighborhood of 200° C. of a phenyl naphthylamine, diacetone alcohol and formic acid, the formic acid being present in an amount equal to approximately one mol of the acid to each unsubstituted hydrogen atom in the amino group, said composite reaction product having antioxidant properties.

7. A rubber product comprising rubber and the composite product resulting from the simultaneous interaction, at a temperature in the neighborhood of 200° C., of a secondary aromatic amine, a ketone and formic acid, the formic acid being present in an amount equal to approximately one mol of the acid to one mol of the amine, said composite product having antioxidant properties.

8. A rubber product comprising rubber and the composite product resulting from the simultaneous interaction of a primary aromatic amine, a ketone and formic acid, the formic acid being present in an amount equal to approximately two mols of the acid to one mol of the amine, said composite product having antioxidant properties.

9. A rubber product comprising rubber and the composite product resulting from the simultaneous interaction, at a temperature in the neighborhood of 200° C., of a secondary aromatic amine, diacetone alcohol and formic acid, the formic acid being present in an amount equal to approximately one mol of the acid to one mol of the amine, said composite product having antioxidant properties.

10. A rubber product of improved age-resisting characteristics comprising rubber and the composite product resulting from the simultaneous interaction of an amine having the formula R—NH—R₁, wherein R is aryl and R₁ is aryl, alkyl or hydrogen, a hydrocarbon carbonyl compound in which one substituent of the carbonyl group contains a hydrocarbon structure and the other substituent is hydrogen or contains a hydrocarbon structure, and formic acid, the formic acid being present in an amount equal to approximately one mol of the acid to each unsubstituted hydrogen atom in the amino group, said composite product having antioxidant properties.

11. A rubber product of improved age-resisting characteristics comprising rubber and the composite reaction product resulting from the simultaneous interaction, at a temperature in the neighborhood of 200° C., of a phenyl naphthylamine, diacetone alcohol and formic acid, the formic acid being present in an amount equal to approximately one mol of the acid to each unsubstituted hydrogen atom in the amino group, said composite product having antioxidant properties.

12. A method of preserving rubber which comprises vulcanizing the same in the presence of the composite reaction product resulting from the simultaneous interaction of p-p'-diamino diphenyl methane, acetone and formic acid, the formic acid being present in an amount equal to approximately one mol of the acid to each unsaturated hydrogen atom in the amino groups, said composite reaction product having antioxidant properties.

13. A method of preserving rubber which comprises vulcanizing the same in the presence of the composite reaction product resulting from the simultaneous interaction of ortho-amino-meta cresol, acetone and formic acid, the formic acid being present in an amount equal to approximately one mol of the acid to each unsubstituted hydrogen atom in the amino group, said composite reaction product having antioxidant properties.

WERNER M. LAUTER.